(12) United States Patent
Spitans et al.

(10) Patent No.: US 12,048,081 B2
(45) Date of Patent: Jul. 23, 2024

(54) EIGA COIL HAVING ANNULAR TURNS

(71) Applicant: ALD VACUUM TECHNOLOGIES GMBH, Hanau (DE)

(72) Inventors: Sergejs Spitans, Frankfurt am Main (DE); Markus Winton, Karben (DE); Franz Pfahls, Bad Soden-Salmünster (DE); Henrik Franz, Freigericht-Horbach (DE); Hans-Jürgen Radtke, Geiselbach (DE)

(73) Assignee: ALD VACUUM TECHNOLOGIES GMBH, Hanau (DE)

( * ) Notice: Subject to any disclaimer, the term of this patent is extended or adjusted under 35 U.S.C. 154(b) by 0 days.

(21) Appl. No.: 17/635,141

(22) PCT Filed: Aug. 12, 2020

(86) PCT No.: PCT/EP2020/072635
§ 371 (c)(1),
(2) Date: Feb. 14, 2022

(87) PCT Pub. No.: WO2021/028476
PCT Pub. Date: Feb. 18, 2021

(65) Prior Publication Data
US 2022/0330391 A1    Oct. 13, 2022

(30) Foreign Application Priority Data

Aug. 15, 2019   (DE) .................... 10 2019 121 998.1

(51) Int. Cl.
*H05B 6/18*      (2006.01)
*B22F 9/08*      (2006.01)
(Continued)

(52) U.S. Cl.
CPC ............... *H05B 6/18* (2013.01); *B22F 9/082* (2013.01); *B33Y 80/00* (2014.12); *H05B 6/367* (2013.01);
(Continued)

(58) Field of Classification Search
CPC .......... B22F 10/00; B22F 10/14; B22F 10/28; B22F 2009/0836; B22F 2009/0848;
(Continued)

(56) References Cited

U.S. PATENT DOCUMENTS 5,284,329 A * 2/1994 Hohman ................. B22F 9/082
                                                     75/367
10,946,449 B2   3/2021 Gerking et al.
(Continued)

FOREIGN PATENT DOCUMENTS

CN    107900367 A    4/2018
CN    108213449 A    6/2018
(Continued)

OTHER PUBLICATIONS

International Search Report dated Sep. 15, 2020, prepared in International Application No. PCT/EP2020/072635.

*Primary Examiner* — Dana Ross
*Assistant Examiner* — Joe E Mills, Jr.
(74) *Attorney, Agent, or Firm* — Barnes & Thornburg LLP; Ryan L. Marshall

(57) ABSTRACT

The invention relates to an EIGA coil (10) for partial melting an electrode (40). The EIGA coil (10) comprises a plurality of windings (12A, 12B, 12C) which are coaxially arranged with respect to a center axis (M) and axially spaced from each other, wherein each of the plurality of windings (12A, 12B, 12C) is formed in the shape of a ring interrupted by a gap (14A, 14B, 14C) and equidistant with respect to the center axis (M) and extending in a plane perpendicular to the (Continued)

center axis (M). Adjacent windings (12A, 12B; 12B, 12C) of the plurality of windings (12A, 12B, 12C) are respectively connected to each other via a connecting portion (20AB, 20BC; 120AB, 120BC).

19 Claims, 5 Drawing Sheets

(51) Int. Cl.
*B33Y 80/00* (2015.01)
*H05B 6/36* (2006.01)

(52) U.S. Cl.
CPC ............... *B22F 2009/0836* (2013.01); *B22F 2009/0848* (2013.01)

(58) Field of Classification Search
CPC ............ B22F 2009/088; B22F 2998/00; B22F 2999/00; B22F 9/082; B22F 2202/07; B33Y 80/00; C22C 1/0425; H05B 6/18; H05B 6/367; Y02P 10/25
See application file for complete search history.

(56) References Cited

U.S. PATENT DOCUMENTS

2016/0318105 A1\* 11/2016 Gerking ................. B22F 9/082
2021/0154770 A1  5/2021 Alf et al.

FOREIGN PATENT DOCUMENTS

| CN | 105899312 B | 7/2019 |
| DE | 4102101 A1 | 7/1992 |
| DE | 102013022096 A1 | 6/2015 |
| JP | 2015220063 A | 12/2015 |
| RU | 2309388 C2 | 10/2007 |
| WO | 2015092008 A1 | 6/2015 |
| WO | 2019002122 A1 | 1/2019 |

\* cited by examiner

EIGA COIL HAVING ANNULAR TURNS

This application is a National Stage application of International Application No. PCT/EP2020/072635, filed Aug. 12, 2020. This application also claims priority under 35 U.S.C. § 119 to German Patent Application No. 10 2019 121 998.1, filed Aug. 15, 2019.

The present invention relates to an EIGA (Electrode Induction Melting (Inert) Gas Atomization) coil for partial melting an electrode for the production of high quality and pure metal powders. An EIGA coil refers to an induction coil for an EIGA system for performing an EIGA method. Furthermore, the present invention relates to an apparatus for performing an EIGA method and to an EIGA method for producing high-purity metal powder.

BACKGROUND OF THE INVENTION

The EIGA method for a ceramic-free production of high-purity metal or precious metal powders, such as powders of titanium, zirconium, niobium and tantalum alloys, is based on performing an electrode induction melting process. A vertically suspended rotating electrode is continuously supplied under vacuum or an inert gas atmosphere to a conical induction coil (EIGA coil) arranged below it and is partial melted or melted off contactless by means of the coil. The rotational movement of the electrode about its own longitudinal axis ensures a uniform melting of the electrode. A jet of molten material generated by the partial melting or melting-off process then flows through an inert gas nozzle arranged under the induction coil (EIGA coil), where it is atomized or vaporized. The mist of microdroplets then solidifies in the downstream atomization tower and forms a spherically shaped, fine-grained powder. The powder formed is collected and accumulated in a vacuum-tight container.

Bar electrodes made of a desired metal or a special alloy can be used for the EIGA method. In particular, these electrodes can have a diameter of up to 150 mm and a length of up to 1000 mm.

The conical design of the EIGA coil (induction coil) and a set generator frequency are optimized for melting the electrode and dripping-off the melt from one end of the electrode. Conventional EIGA coils are in the form of a conical helix or a helical curve extending conically. For this purpose, in practice, a copper tube forming the windings of the EIGA coil is wound over a predefined form.

An EIGA method of the type described and an associated EIGA system are disclosed, for example, in document DE 41 02 101 A1.

When carrying out the EIGA method, it can happen in known EIGA systems that droplets of molten metal that have melted off the electrode do not fall exactly through the inert gas nozzle. Instead, some droplets fall, for example, onto the edge or a frame of the cold inert gas nozzle, solidify there and may partially or completely clog the nozzle under certain circumstances. Also, melted off droplets may hit the induction coil and cause a short circuit that interrupts the process flow.

It is therefore an object of the present invention to overcome the disadvantages of the prior art. In particular, one object of the invention is to provide an EIGA coil, an apparatus for performing an EIGA method, and a method for producing high-purity metal powder that avoids a contamination and/or a damage of the EIGA system by droplets melted off from the electrode.

These objects are achieved by an EIGA coil for melting off an electrode, an apparatus for performing an EIGA method and a method for producing high-purity metal powder according to the independent claims. Further developments and embodiments of the EIGA coil, the apparatus and the method are subject matter of the dependent claims and the description below.

DESCRIPTION OF THE INVENTION

The EIGA coil according to the invention for partial melting on and melting off an electrode comprises a plurality of windings arranged coaxially to one another with respect to a center axis of the EIGA coil and axially spaced apart from one another. The center axis of the EIGA coil extends coaxial with a longitudinal axis of the electrode.

In the context of the present invention, the term EIGA coil refers to an induction coil for an EIGA system or for carrying out an EIGA method. The EIGA coil may comprise at least two windings, preferably at least three windings or even more than three windings.

According to the invention, each of the plurality of windings is in the form of a ring interrupted by a gap. The EIGA coil thus comprises a number of rings corresponding to the number of windings, wherein each of the rings is interrupted by a gap of small width and is thus not closed. More specifically, each of the rings is a ring segment comprising a first end and a second end, wherein the associated gap is disposed between the two ends of the ring segment. Because each ring segment forms a nearly complete ring due to the very narrow width of the associated gap, it is referred to in the context of the present invention as an interrupted ring or ring.

According to the invention, each interrupted ring is equidistant with respect to the center axis and extends within a plane which is perpendicular to the center axis and associated with the respective ring. In other words, each of the plurality of windings extends within a respective associated plane that is perpendicular to the center axis. The planes in which the individual rings or windings extend are thus parallel to each other. In other words, the rings or windings are arranged parallel to each other. In operation, the planes in which the individual rings or windings extend are horizontal. It is to be understood, that the windings or rings are three-dimensional objects and that the extension of each winding or ring (more precisely ring torus) in only one plane perpendicular to the center axis describes an extension of a three-dimensional object according to this plane or in coincident orientation of this plane. In other words, the extension of each winding or ring in only one plane perpendicular to the center axis describes that a horizontal cross-sectional area of the winding or ring forming a (nearly complete) circular ring extends only in this plane.

Adjacent windings of the plurality of windings are respectively connected to each other by a connecting portion. The connecting portion may be connected to the adjacent windings in the region of the associated gap. In particular, each connecting portion may connect a second end of a winding of the plurality of windings to a first end of a winding adjacent thereto of the plurality of windings.

The EIGA coil may have an overall conical design. For this purpose, at least two of the windings or circular rings have different inner diameters. In one embodiment, all windings of the EIGA coil may have different inner diameters. Alternatively, some windings may have the same inner diameter and may have a different inner diameter compared to further windings of the EIGA coil. In particular, the EIGA coil may have an overall tapered shape when viewed along the center axis in the direction of a downstream inert gas nozzle. For this purpose, a winding of the EIGA coil that is arranged closer in the direction of the downstream inert gas nozzle has a smaller or at most the same inner diameter as a winding that is further away from the inert gas nozzle, wherein the winding that is closest to the inert gas nozzle has a smaller inner diameter than the winding furthest away from the inert gas nozzle.

Since each of the plurality of windings extends only within an associated plane perpendicular to the center axis, azimuthally symmetrical Lorentz forces acting on the electrode can be generated by means of the EIGA coil according to the invention. Since these azimuthally symmetrical Lorentz forces acting on the electrode balance each other out, lateral deflection of the electrode is prevented and the electrode remains coaxial with the center axis of the EIGA coil throughout the entire EIGA method. This ensures that a lower tip of the electrode, which is partial melted by means of the EIGA coil, remains precisely aligned above the center of the inert gas nozzle, so that a generated jet of molten metal or droplet of molten metal always passes centrally through the nozzle without contacting the edge of the nozzle.

In the helical structure of the EIGA coil known in the prior art, opposing winding sections have different distances from the electrode. The inventors of the present invention have recognized that the Lorentz forces generated by such EIGA coils and acting on the electrode are therefore azimuthally asymmetric and deflect the electrode from its vertical orientation. This results in a deflection angle between the center axis of the EIGA coil and the longitudinal axis of the electrode. The lower tip of the electrode is no longer located centrally above the inert gas nozzle. As a result, droplets melted off from the electrode can hit the edge or a frame of the cold inert gas nozzle, solidify there and partially or completely clog the nozzle under certain circumstances. Droplets melted off can also hit the induction coil and contaminate it or cause a short circuit. In addition, the electrode itself may come into contact with the EIGA coil, causing a short circuit. These negative effects are further enhanced because the electrode rotates continuously about the deflected longitudinal axis. These disadvantages can be reduced by the EIGA coil according to the invention and the thus generatable Lorentz forces acting azimuthally symmetrical on the electrode can be reduced.

In a further embodiment of the EIGA coil, the connecting portion may extend in a plane of the center axis, i.e., in a plane in which the vertical center axis of the EIGA coil lies. For example, the connecting portion may extend parallel to the center axis of the EIGA coil. The connecting portion may extend at a right angle to the planes of the windings. In particular, each of the connecting portions that respectively connect adjacent windings with each other may extend relative to the center axis of the EIGA coil in the manner described above. In the assembled state, the windings may extend, for example, in the horizontal direction and/or the connecting portions may extend, for example, in the vertical direction.

According to one embodiment, the gap may be between 0.5 mm and 30 mm wide, preferably between 2 mm and 20 mm, more preferably between 5 mm and 10 mm. The gap may be at least 0.5 mm wide, in particular at least 2 mm, preferably at least 5 mm. In embodiments, the gap may be 30 mm or smaller, in particular 20 mm or smaller, preferably 10 mm or smaller. The gap width here refers to the distance between the first end and the second end of the associated winding or ring. The above ranges of gap widths may apply to the gap of each winding of the EIGA coil. The gaps of the different windings may have the same width or different widths. A gap width between 0.5 mm and 30 mm, preferably between 2 mm and 20 mm, more preferably between 5 mm and 10 mm, can ensure that the overall arrangement of the EIGA coil is sufficiently azimuthally symmetric to ensure the application of substantially and sufficiently azimuthally symmetric Lorentz forces to the electrode.

A winding of the plurality of windings of the EIGA coil having the largest inner diameter may have an inner diameter between 40 mm and 300 mm. The dimensions of the windings of the EIGA coil, in particular the dimensions of the uppermost winding of the EIGA coil, i.e. the winding closest to the suspension of the electrode, can be selected according to the dimensions of the electrode to be melted off. A winding of the plurality of windings having the smallest inner diameter may have an inner diameter between 10 mm and 100 mm, preferably between 20 mm and 50 mm. The winding with the smallest inner diameter may have an inner diameter of at least 10 mm, preferably at least 20 mm. The winding with the smallest inner diameter may have an inner diameter of 100 mm or less, preferably of 50 mm or less. It is to be understood that EIGA coils with windings of comparatively large inner diameter may have comparatively large gap widths within the ranges defined above. Correspondingly, EIGA coils with windings of comparatively small inner diameter may have comparatively small gap widths within the above defined ranges.

In a further embodiment, the EIGA coil may have different cross-sectional geometries with respect to shape and/or dimensions. For example, the EIGA coil may have sections of oval, circular, rectangular, square, or other cross-section.

For example, the cross-sectional geometry of the EIGA coil may vary in shape and/or dimensions within the same winding or between different windings.

In particular, the EIGA coil may be made of non-ceramic copper material.

The EIGA coil may be produced by use of an additive production process. In particular, the EIGA coil may be produced by use of a 3D printing process, for example, by use of a selective laser melting process. Alternatively, the EIGA coil may be produced by means of an electron beam melting process, by means of binder jetting or any other additive production process. The production of the EIGA coil according to the invention by means of an additive production process is particularly evident in the fact that very small gap widths of the rings can be realized in this way. In addition, an additive production process enables to form interconnection sections between adjacent windings that extend perpendicular to the windings. Neither of these can be achieved with conventional production processes for EIGA coils. In conventional production processes of EIGA coils, copper tubes filled with sand are bent to form the windings of the EIGA coil by use of a predefined form, but this severely limits the forming of the windings.

Another aspect of the invention relates to an apparatus or EIGA system for performing an EIGA method. The apparatus comprises an EIGA coil of the type described above. The apparatus further comprises an electrode of metal or metal alloy to be melted off, arranged coaxially with the plurality of windings, which electrode extends in sections into the EIGA coil and is displaceable along a longitudinal axis of the electrode relative to the EIGA coil to be melted off by means of the EIGA coil. The electrode is also rotatable about its longitudinal axis. Further, the apparatus includes a nozzle or inert gas nozzle for atomizing melted-off electrode material disposed coaxially with the electrode and the plurality of coils.

The apparatus may further comprise an atomization tower within which the atomized electrode material may solidify to form the spherically shaped, fine-grained powder.

Another aspect of the present invention relates to an EIGA method for producing high purity metal powder. The method comprises the steps of:
- displacing an electrode relative to an EIGA coil, thereby introducing the electrode section-wise into the interior of the EIGA coil;
- applying an alternating current to the EIGA coil to partial melt the electrode by generating Lorentz forces that are azimuthally symmetric with respect to a longitudinal axis of the electrode; and
- atomizing melted-off electrode material by means of an inert gas nozzle located downstream of the EIGA coil.

In particular, the electrode can be partial melted by means of an EIGA coil of the type described above.

The electrode can be rotated about its longitudinal axis during the method.

Although some aspects and features have been described only with respect to the EIGA coil, they may apply mutatis mutandis to the apparatus or EIGA system and/or to the EIGA method as well as corresponding further embodiments, and vice versa.

BRIEF DESCRIPTION OF THE FIGURES

Exemplary embodiments of the present invention are explained in more detail below with reference to the accompanying schematic figures. In the Figures.

DESCRIPTION OF THE FIGURES

Identical reference signs in the figures indicate identical, similarly acting and/or analogous elements.

Figure 1:
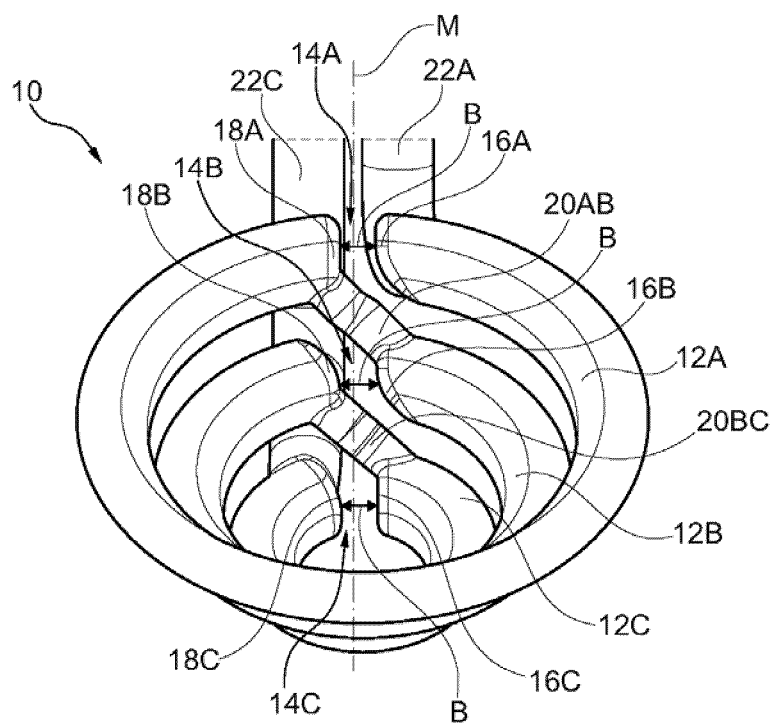
FIG. 1 shows a perspective view of an EIGFA coil according to an exemplary embodiment.
Figure 2:
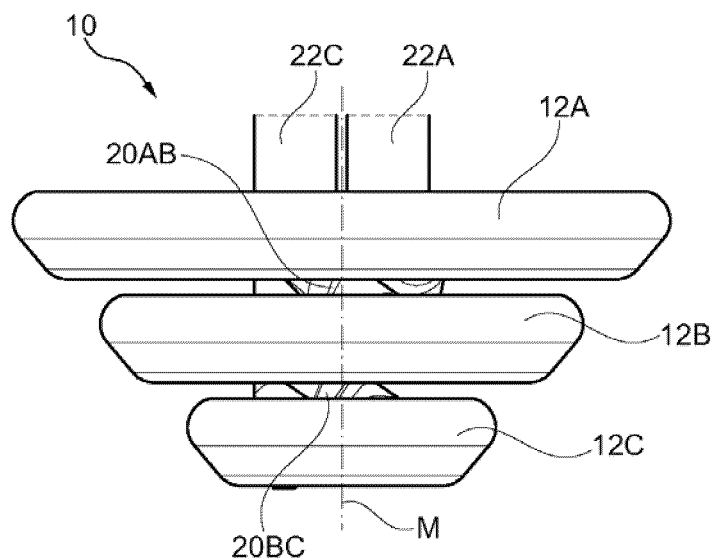
FIG. 2 shows a front view of the EIGA coil according to the exemplary embodiment of FIG. 1.
Figure 3:
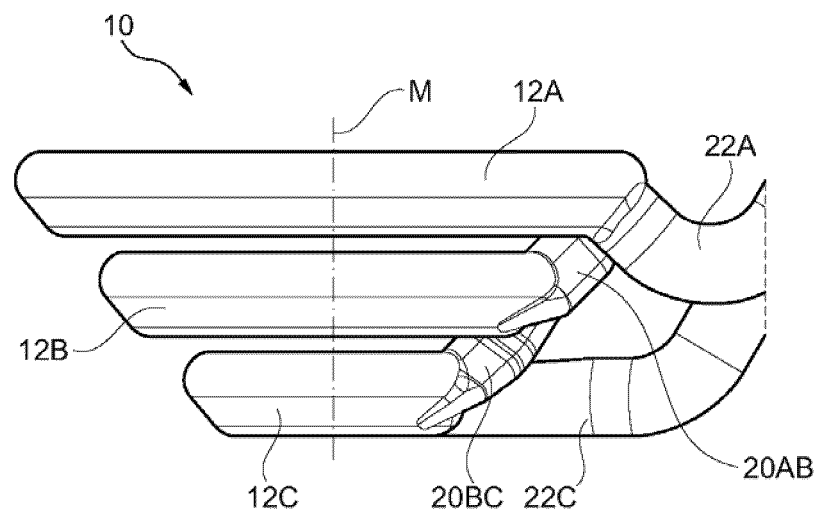
FIG. 3 shows a side view of the EIGA coil according to the exemplary embodiment of FIG. 1.
Figure 4:
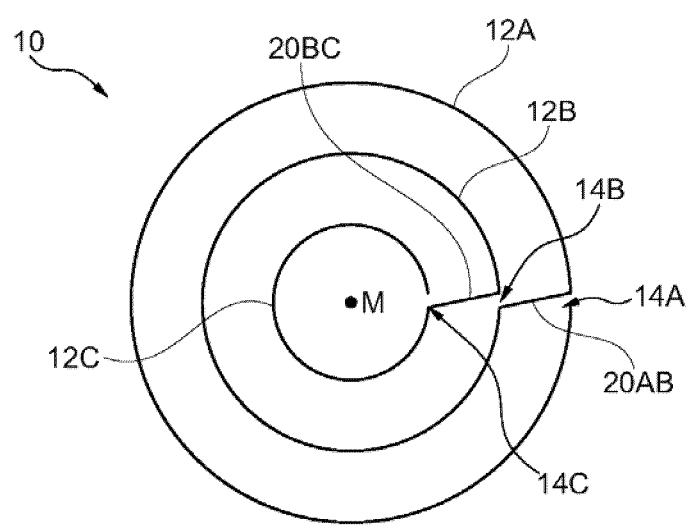
FIG. 4 shows a schematic top view of the EIGA coil according to the exemplary embodiment of FIG. 1.

FIGS. 1 to 3 show an exemplary embodiment of the EIGA coil 10 according to the invention for partial melting and melting off an electrode in a perspective view (FIG. 1), a front view (FIG. 2) and a side view (FIG. 3). In addition, FIG. 4 shows a schematic top view of the EIGA coil 10.

The EIGA coil 10, which is an induction coil for an EIGA system for performing an EIGA method, comprises a plurality of windings 12A, 12B, 12C. In the exemplary embodiment shown, the EIGA coil 10 comprises three windings 12A, 12B, 12C. In other exemplary embodiments, the EIGA coil may comprise more than three windings.

The windings 12A, 12B, 12C are arranged coaxially with each other with respect to a center axis M of the EIGA coil 10. In addition, the windings 12A, 12B, 12C are axially spaced from each other as viewed in the direction of the center axis M. The windings 12A, 12B, 12C each have different inner and outer diameters, wherein the uppermost winding 12A in FIGS. 1 to 3 has the largest inner and outer diameters of the three windings 12A, 12B, 12C, and the lowermost winding 12C in FIGS. 1 to 3 has the smallest inner and outer diameters of the three windings 12A, 12B, 12C. The values of the inner and outer diameters of the middle winding 12B arranged between the uppermost winding 12A and the lowermost winding 12C lie between those of the inner and outer diameters of the uppermost winding 12A and the lowermost winding 12C, respectively. In this way, the EIGA coil 10 has a conical shape when viewed as a whole. In operation, the EIGA coil 10 is arranged such that the uppermost winding 12A with the largest inner and outer diameters faces an electrode suspension (not shown) and the lowermost winding 12B with the smallest inner and outer diameters faces an intergas nozzle (not shown). Exemplary inner diameters are quantified in connection with FIG. 6.

Each of the windings 12A, 12B, 12C has the shape of a ring, more precisely a ring torus which is interrupted by a respective associated gap 14A, 14B, 14C. Compared to the dimensions of the EIGA coil 10, in particular to the dimensions of the windings 12A, 12B, 12C, the gaps 14A, 14B, 14C each have a very small width B. For example, each of the three gaps 14A, 14B, 14C may have a width B between 0.5 mm and 30 mm. Preferably, the gaps 14A, 14B, 14C are each at least 2 mm wide in order to minimize the risk of short circuits and/or sparking. Since the gaps 14A, 14B, 14C interrupt the rings 12A, 12B, 12C, the rings are not closed so that each of the rings 12A, 12B, 12C has a first end 16A, 16B, 16C and a second end 18A, 18B, 18C. In the exemplary embodiment shown, the widths B of the three gaps 14A, 14B, 14C are identical. However, in alternative exemplary embodiments, the different gaps may have different widths.

As can be seen in FIGS. 1 to 3, and in particular in FIG. 4, each of the rings 12A, 12B, 12C is equidistant with respect to the center axis M of the EIGA coil 10. In other words, each of the rings 12A, 12B, 12C has substantially the same distance from the center axis M when viewed along its inner circumferential surface.

Furthermore, it is shown in FIGS. 1 to 4 that each of the windings 12A, 12B, 12C or each of the rings 12A, 12B, 12C is oriented only in the horizontal direction. That is, each of the windings 12A, 12B, 12C extends only within a plane which is perpendicular to the center axis M and is associated to a respective winding 12A, 12B, 12C, more specifically in the same orientation as this associated plane. The windings 12A, 12B, 12C are aligned parallel to each other. This represents a significant difference to prior art EIGA coils with helical windings, in which the windings extend helically in all three spatial directions.

Since in the EIGA coil 10 according to the invention each of the windings 12A, 12B, 12C is aligned according to an associated plane which is perpendicular to the center axis M, and each of the windings or each of the rings 12A, 12B, 12C is equidistant to the center axis M, azimuthally symmetrical Lorentz forces acting on the electrode can be generated by means of the EIGA coil 10 according to the invention. The resulting effects and advantages are explained in more detail below in connection with FIGS. 7 to 10.

Adjacent windings 12A and 12B or 12B and 12C of the EIGA coil 10 are respectively connected to each other by a connecting portion 20AB, 20BC. More specifically, the connecting portion 20AB connects the second end 18A of the winding 12A to the first end 16B of the winding 12B. Accordingly, the connecting portion 20BC connects the second end 18B of the winding 12B to the first end 16C of the winding 12C. In the exemplary embodiment of FIG. 1, the connecting portions 20AB, 20BC have an arrangement extending transverse with respect to the center axis M. However, in other exemplary embodiments, a different orientation of the connecting portions may preferably be provided, which is described in more detail in connection with FIG. 5.

The first end 16A of the uppermost winding 12A and the second end 18C of the lowermost winding 12C are respectively connected via a terminal portion 22A, 22C to a voltage source for applying an AC voltage to the EIGA coil 10.

The windings 12A, 12B, 12C, the connecting portions 20AB, 20BC, and the terminal portions 22A, 22C are made of a non-ceramic copper material. In particular, the windings 12A, 12B, 12C, the connecting portions 20AB, 20BC and the terminal portion 22A, 22C of the EIGA coil 10 of the shown exemplary embodiment are hollow cylindrical.

As can be seen from FIG. 1, the connecting portions 20AB, 20BC have a different cross-sectional geometry than the windings 12A, 12B, 12C. However, in further exemplary embodiments, the windings and the connecting portions may have the same cross-sectional geometry.

Figure 5:
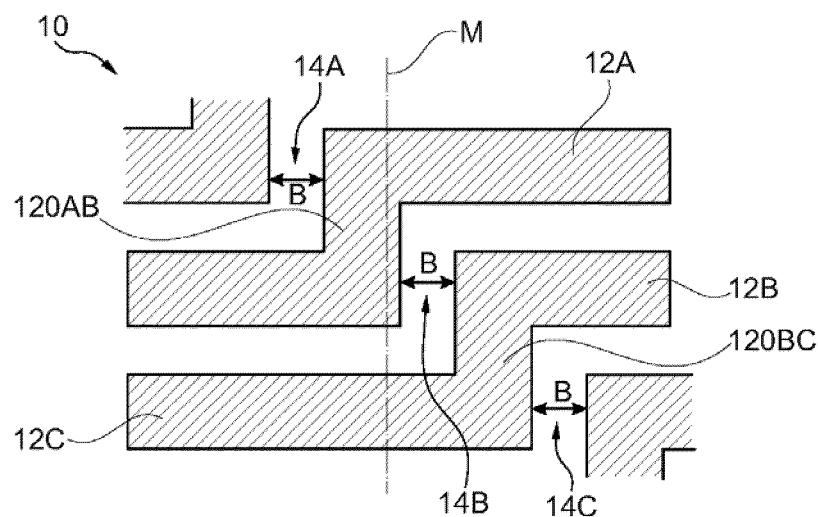
FIG. 5 shows a schematic representation of the connection sections of an EIGA coil according to a further exemplary embodiment.

FIG. 5 shows a schematic representation of an enlarged section of the EIGA coil according to a further exemplary embodiment. The enlarged section shows a particular design of the connecting portions 120AB, 120BC, according to which the connecting portions 120AB, 120BC each extend in the plane of the center axis M and thus essentially perpendicular to the windings 12A, 12B, 12C. The windings 12A, 12B, 12C thus extend horizontally in operation and in the depiction shown, while the connecting portions 120AB, 120BC extend vertically. This structural design of the connecting portions 120AB, 120BC in a direction perpendicular to the windings 12A, 12B, 12C enables a provision of an EIGA coil with gaps 14A, 14B, 14C of particularly small width B. By providing a particularly small width B of the gaps 14A, 14B, 14C, the windings 12A, 12B, 12C can be formed in the form of only slightly interrupted and therefore nearly complete rings, which increases the symmetry of the overall arrangement and further improves the application of azimuthally symmetrical Lorentz forces to the electrode.

Figure 6:
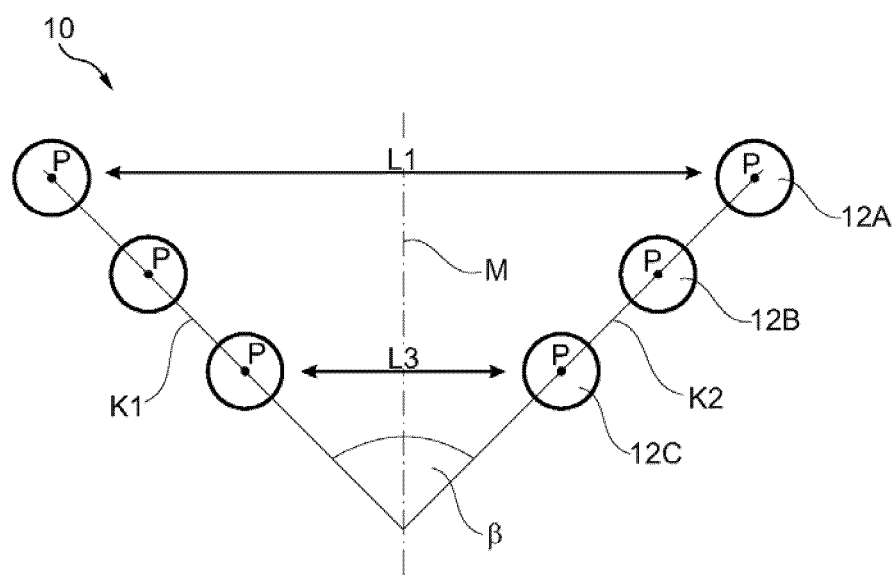
FIG. 6 shows a schematic sectional view of an EIGA coil according to the exemplary embodiment of FIG. 1.

FIG. 6 shows a schematic sectional view of an EIGA coil 10 according to the above exemplary embodiments. In the EIGA coil 10 of FIG. 6, the uppermost winding 12A has the largest inner diameter L1 of the plurality of windings 12A, 12B, 12C with an amount of up to 300 mm. The lowest winding 12C has the smallest inner diameter L3 of the plurality of windings 12A, 12B, 12C with an amount of at least 10 mm.

The EIGA coil 10 has in the overall view a conical shape due to the shown arrangement of the windings 12A, 12B, 12C with different diameters disposed coaxially with respect to each other and axially spaced apart from each other. Two lines K1 and K2, which are mirrored at the center axis M and respectively extend through the center points P of the vertical cross sections of the windings 12A, 12B, 12C span an angle β between 30° and 180°, preferably of 90°. The center points P through which the line K1 extends are disposed opposite the center points P through which the line K2 extends, with respect to the center axis M.

Figure 7:
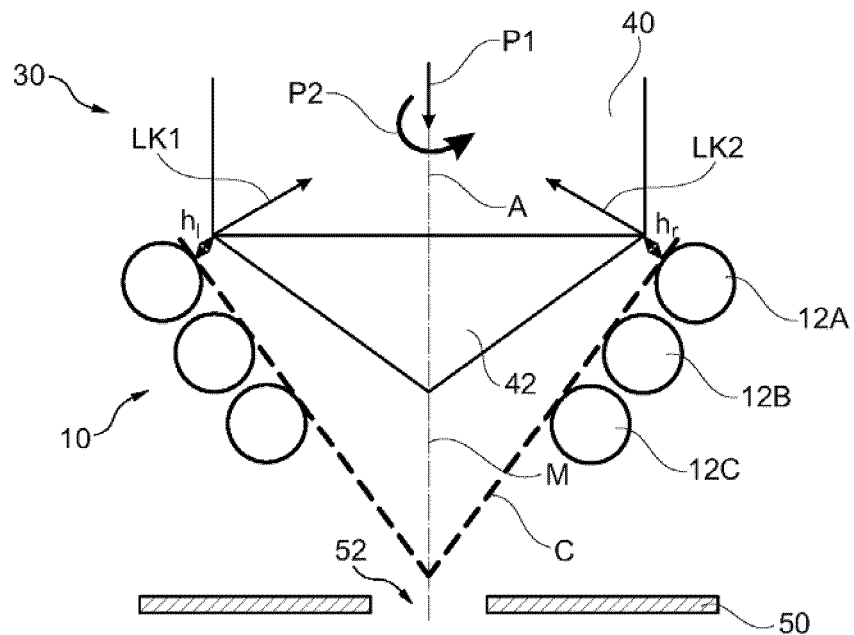
FIG. 7 shows a schematic sectional view of an EIGA system according to an exemplary embodiment in an initial state.

FIG. 7 shows a schematic sectional view of an EIGA system 30 for performing an EIGA method, comprising an EIGA coil 10, an electrode 40 having a longitudinal axis A, and an inert gas nozzle 50. In FIG. 7, the EIGA system is in an initial state at a time t=0, which corresponds to the time of a first power-up of the EIGA coil 10. For an improved illustration of the orientation of the components of the EIGA system with respect to each other, an imaginary cone C formed by the windings of the EIGA coil is shown by dashed lines in each of FIGS. 7 to 10.

The electrode 40 is a rod electrode made of a metal or metal alloy, comprising a lower tip 42. The electrode 40 extends into the interior of the EIGA coil 10 in the region of the lower tip 42, to be partial melted or melted off by means of the AC energized EIGA coil 10. The electrode 40 is disposed coaxial with the windings 12A, 12B, 12C of the EIGA coil 10, that is, the longitudinal axis A of the electrode 40 is in line with the center axis M of the EIGA coil. The electrode 40 can continuously be repositioned along its longitudinal axis A in the direction of the inert gas nozzle 50 during the EIGA method according to the melted off volume, which is indicated by the arrow P1. Moreover, the electrode 40 is rotatable about its longitudinal axis A during the EIGA method in order to ensure a uniform melting off, which is indicated by the arrow P2.

The inert gas nozzle 50 is located downstream of the EIGA coil 10 and the electrode 40, i.e., below the latter in the depiction shown. The inert gas nozzle 50 includes an orifice 52 that is also coaxial with the electrode 40 and the windings 12A, 12B, 12C of the EIGA coil 10. In other words, the longitudinal axis A of the electrode 40 and the center axis M of the EIGA coil 10 extend exactly through the center of the orifice 52 of the inert gas nozzle 50.

As can be seen in FIG. 7, the winding 12A has the same smallest distance $h_l$, $h_r$ from the electrode 40 at each position of the winding 12A. This is due to the coaxial alignment of the electrode 40 and the EIGA coil 10 as well as to the extension of the windings 12A, 12B, 12C in a plane respectively perpendicular to the center axis M. The same applies to the winding 12B as well as to the winding 12C of the EIGA coil 10, which is also shown in FIG. 7, but for reasons of clarity is not illustrated by reference symbols.

Due to the uniform distances of the windings 12A, 12B, 12C from the electrode 40, azimuthally symmetrical Lorentz forces acting on the electrode 40 are generated by the EIGA coil 10. The azimuthally symmetrical Lorentz forces are illustrated by the arrows LK1 and LK2 of equal length. Asymmetries introduced by the gaps are negligible due to the very small width of the gaps.

Figure 8:
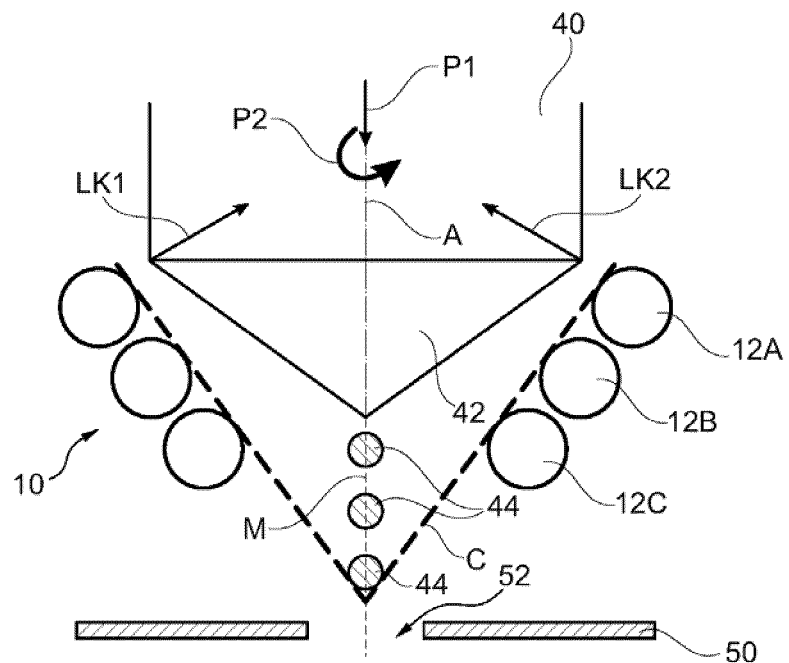
FIG. 8 shows a schematic sectional view of the EIGA system of FIG. 9 in a further state during operation.

FIG. 8 shows the EIGA system 30 of FIG. 7 at a later time t=n, during a melting process in which a nearly continuous melt stream of droplets 44 of melted off material drops or flows from the electrode 40 due to melting off of the electrode 40. Since the Lorentz forces generated by the EIGA coil 10 are azimuthally symmetrical with respect to the electrode 40, the Lorentz forces acting on the electrode 40 cancel each other out, so that the electrode 40 in the state shown in FIG. 8 continues to be oriented according to the initial state. Thus, the electrode 40 is not deflected with respect to the center axis M, but remains aligned coaxially with the EIGA coil throughout the EIGA method. Accordingly, the electrode 40 also remains coaxially aligned with the inert gas nozzle 50 during the melt off process. The melt jet or droplets 40 thus always fall in a vertical direction (along the longitudinal axis A or the center axis M) centrally through the orifice 52 of the inert gas nozzle 50 and thus do not come into contact with the wall of the inert gas nozzle 50 or the windings 12A, 12B, 12C of the EIGA coil 10. This increases the process reliability and reduces possible contaminations or damages to the EIGA system 30.

The droplets 44 falling through the inert gas nozzle 50 are atomized by means of the inert gas nozzle 50 and subsequently solidify in a downstream atomization tower. As a result, the solidified droplets form a spherically shaped, fine-grained powder, which is collected and accumulated in a vacuum-tight container.

Figure 9:
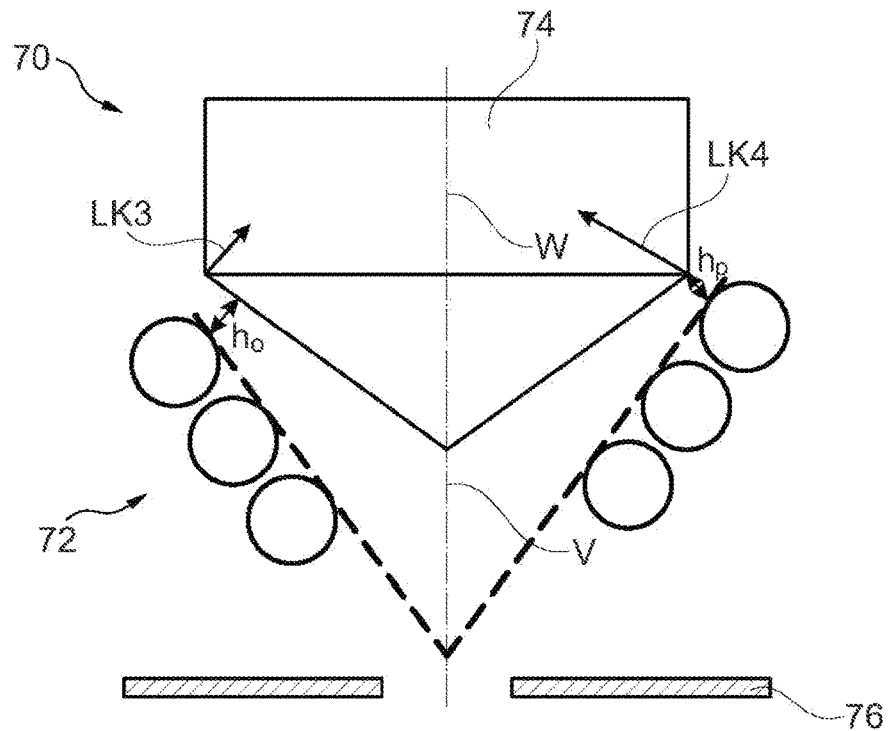
FIG. 9 shows a schematic sectional view of a prior art EIGA system in an initial state.
Figure 10:
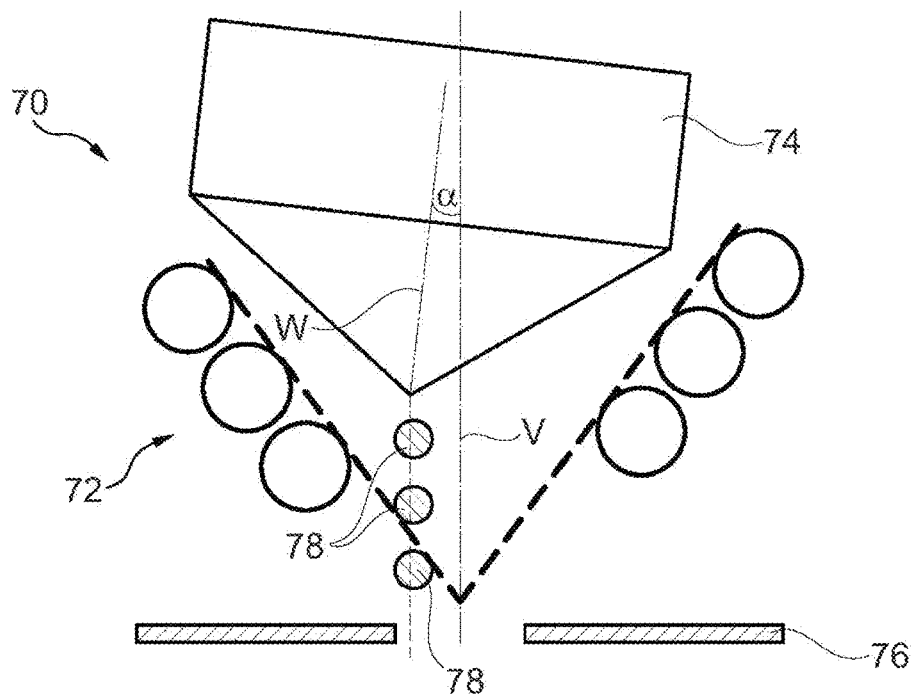
FIG. 10 shows a schematic sectional view of the EIGA system of FIG. 7 in a deflected state.

The advantages of the EIGA coil 10 according to the invention over the prior art are further apparent from a consideration of FIGS. 9 and 10, which show a prior art EIGA system 70 in the operating conditions illustrated in FIGS. 7 and 8.

The prior art EIGA system 70 includes a helical EIGA coil 72, an electrode 74, and an inert gas nozzle 76. In the initial state t=0 shown in FIG. 9, the EIGA coil 72, the electrode 74, and the inert gas nozzle 76 are aligned coaxially with respect to each other. That is, a center axis V of the EIGA coil 72 lies in a line with a longitudinal axis W of the electrode 74, which extends through the center of the inert gas nozzle 76.

In contrast to the arrangement according to the invention, the windings of the prior art EIGA coil 72 have different distances from the electrode 74 due to the helical structure of the EIGA coil 72. This is exemplified by the distances $h_o$ and $h_p$. The different distances of the windings from the electrode 74 lead to differently strong Lorentz forces acting on the electrode 74, i.e. to an azimuthal asymmetry of the Lorentz forces. This is illustrated in FIGS. 9 and 10 by the arrows LK3 and LK4 of different lengths.

The described azimuthal asymmetry of the Lorentz forces acting on the electrode 74 leads to a deflection of the electrode 74, more precisely of the longitudinal axis W of the electrode 74, by the angle α. This can be seen in FIG. 10, which shows the EIGA system 70 of FIG. 9 at a later time t=n during a melting process.

In the state shown, the droplets 78 of melted off material forming a melt jet fall in a vertical direction from the electrode 74 deflected by the angle α in the direction of the inert gas nozzle 76. Due to the deflection, the droplets 78 or the melt jet do not fall centrally through the orifice of the inert gas nozzle 76, but offset relative to the center axis V. This can cause the droplets 78 to fall onto an edge of the inert gas nozzle 76, where they solidify and possibly completely or partially close the orifice of the inert gas nozzle 76. The negative effect may be further enhanced by the rotation of the electrode 74 which generally occurs. Also, due to the deflection of the electrode 74, it may occur, that the droplets 78 or the electrode 74 itself come into contact with the windings of the EIGA coil 72, which may result in short circuits and damage to the EIGA system 70.

These disadvantages can be effectively reduced by the EIGA coil according to the invention and the azimuthally symmetrical Lorentz forces acting on the electrode that can be generated therewith.

LIST OF REFERENCE SYMBOLS

10 EIGA coil
70 EIGA system (prior art)
12A, 12B, 12C winding
72 EIGA coil (prior art)
14A, 14B, 14C gap
74 electrode (prior art)
16A, 16B, 16C first end of winding
76 inert gas nozzle (prior art)
18A, 18B, 18C second end of the winding
78 droplet (prior art)
20AB, 20BC connecting portion V center axis (prior art)
22A, 22B terminal portion
W longitudinal axis (prior art)
120AB, 120BC connecting portion
α angle of deflection (prior art)
30 EIGA system
LK3, LK4 Lorentz forces (prior art)
32 output aperture
$h_o$, $h_p$ distances (prior art)
40 electrode
42 tip of electrode
44 droplet
50 inert gas nozzle
52 orifice
M center axis
B width
K1, K2 lines
P center point
L1 largest inner diameter
L3 smallest inner diameter
β spanned angle
P1 arrow repositioning movement
P2 arrow rotational movement
A longitudinal axis
C imaginary cone
LK1, LK2 Lorentz forces
$h_l$, $h_r$ distances

The invention claimed is:

1. An EIGA coil for melting an electrode, comprising:
a plurality of windings arranged coaxially to each other with respect to a center axis and axially spaced from each another,
wherein each of the plurality of windings is formed in the shape of a ring interrupted by a gap and equidistant with respect to the center axis and extending in a plane perpendicular to the center axis,
wherein adjacent windings of said plurality of windings are respectively connected to each other via a connecting portion and
wherein the gap is between 0.5 mm and 30 mm wide.

2. The EIGA coil according to claim 1, wherein at least two windings of the plurality of windings have different inner diameters.

3. The EIGA coil according to claim 1, wherein the connecting portion extends parallel to the center axis.

4. The EIGA coil according to claim 1, wherein a winding of the plurality of windings that has the largest inner diameter has an inner diameter between 40 mm and 300 mm.

5. The EIGA coil according to claim 1, wherein a winding of the plurality of windings that has the smallest inner diameter has an inner diameter between 10 mm and 100 mm.

6. The EIGA coil according to claim 1, having different cross-sectional geometries in terms of shape and/or dimensions.

7. The EIGA coil according to claim 1 that is made of ceramic-free copper material.

8. The EIGA coil according to claim 1 that is produced by means of an additive production process.

9. An apparatus for performing an EIGA method, comprising:
an EIGA coil according to claim 1;

an electrode arranged coaxially with the plurality of windings and extending partially into the EIGA coil and being displaceable along a longitudinal axis of the electrode relative to the EIGA coil in order to be melted off by the EIGA coil; and a nozzle arranged coaxially with the electrode and the plurality of windings for atomizing melted off electrode material.

10. A method of producing high purity metal powder, comprising:

displacing an electrode relative to an EIGA coil, wherein the EIGA coil includes a plurality of windings arranged coaxially to each other with respect to a center axis and axially spaced from each another, each of the plurality of windings being formed in the shape of a ring interrupted by a gap and equidistant with respect to the center axis and extending in a plane perpendicular to the center axis, adjacent windings of said plurality of windings being respectively connected to each other via a connecting portion and the gap being between 0.5 mm and 30 mm wide;

applying an alternating current to the EIGA coil in order to melt the electrode by generating Lorentz forces that are azimuthally symmetric with respect to a longitudinal axis of the electrode; and atomizing melted off electrode material.

11. An EIGA coil for melting an electrode, comprising:

a plurality of windings arranged coaxially to each other with respect to a center axis and axially spaced from each another, wherein each of the plurality of windings is formed in the shape of a ring interrupted by a gap and equidistant with respect to the center axis and extending in a plane perpendicular to the center axis, wherein adjacent windings of said plurality of windings are respectively connected to each other via a connecting portion, and wherein a winding of the plurality of windings that has the largest inner diameter has an inner diameter between 40 mm and 300 mm.

12. The EIGA coil according to claim 11, wherein at least two windings of the plurality of windings have different inner diameters.

13. The EIGA coil according to claim 11, wherein the connecting portion extends parallel to the center axis.

14. The EIGA coil according to claim 11, wherein the gap is between 0.5 mm and 30 mm wide.

15. The EIGA coil according to claim 11, wherein a winding of the plurality of windings that has the smallest inner diameter has an inner diameter between 10 mm and 100 mm.

16. The EIGA coil according to claim 11, having different cross-sectional geometries in terms of shape and/or dimensions.

17. The EIGA coil according to claim 11 that is made of ceramic-free copper material.

18. The EIGA coil according to claim 11 that is produced by means of an additive production process.

19. An apparatus for performing an EIGA method, comprising:

an EIGA coil according to claim 11;

an electrode arranged coaxially with the plurality of windings and extending partially into the EIGA coil and being displaceable along a longitudinal axis of the electrode relative to the EIGA coil in order to be melted off by the EIGA coil; and a nozzle arranged coaxially with the electrode and the plurality of windings for atomizing melted off electrode material.

\* \* \* \* \*